March 22, 1938.  A. E. CULLEN  2,112,072
TOY ELECTRIC AUTOMOBILE AND ROADWAY THEREFOR
Filed March 27, 1936  2 Sheets-Sheet 1

INVENTOR
Albert Edward Cullen
BY
Synnestvedt & Lechner
ATTORNEYS

March 22, 1938. A. E. CULLEN 2,112,072
TOY ELECTRIC AUTOMOBILE AND ROADWAY THEREFOR
Filed March 27, 1936 2 Sheets-Sheet 2
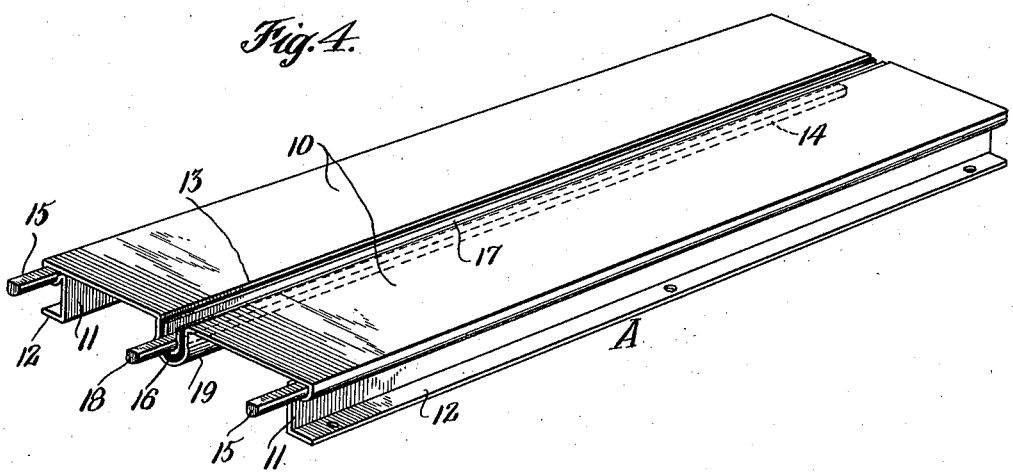
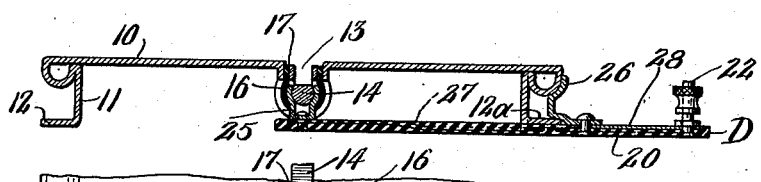
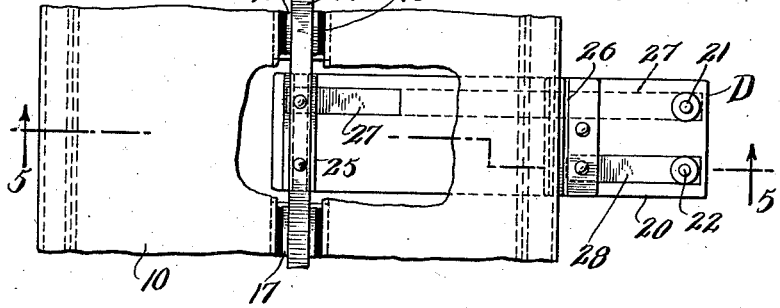
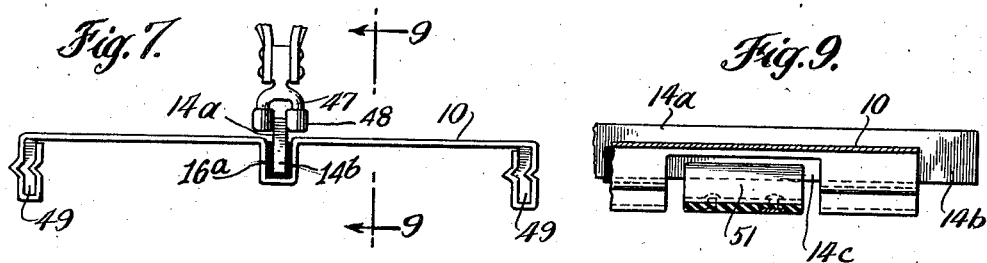
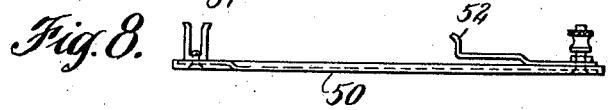
INVENTOR
Albert Edward Cullen
BY
Synnestvedt & Lechner
ATTORNEYS Patented Mar. 22, 1938

2,112,072

UNITED STATES PATENT OFFICE 2,112,072

TOY ELECTRIC AUTOMOBILE AND ROADWAY THEREFOR

Albert Edward Cullen, Willow Grove, Pa.

Application March 27, 1936, Serial No. 71,236

5 Claims. (Cl. 104—60)

This invention relates to toy electric automobiles and roadways therefor.

One of the primary objects of my invention is the provision of a toy electric motor driven automobile adapted to run on a roadway which supplies electric current to the motor of the automobile.

Another object of my invention resides in the provision of a toy automobile of the above character adapted to run on a roadway which is provided with electric conductor means adapted to effect guiding and steering of the automobile.

More specifically it is an object of my invention to provide an automobile having means adapted to pick up electric current from a roadway and effect guiding and steering of the automobile.

A further object of my invention resides in the provision of a toy automobile and roadway of the above character in which the roadway has a plane road surface over which the wheels of the automobile travel in the usual manner of automobiles and in which the automobile is steered and guided from electric conductor means associated with the plane road surface.

How the foregoing, together with such other objects and advantages as will hereinafter appear or are incident to my invention are realized, is illustrated in preferred form in the accompanying drawings, wherein:

Figure 4 is a perspective view of a section of the roadway;

Figure 5 is a cross section through a section of the roadway illustrating the application of an electric connector, the section being taken on the line 5—5 of Figure 6;

Figure 6 is a fragmentary plan view of Figure 5 with a portion of the road surface broken away.

Figure 7 is an end view of a modified form of road section;

Figure 8 illustrates an electric connector adapted to be employed with the form of road section shown in Figure 7; and Figure 9 is a section taken on the line 9—9 of Fig. 7 showing how the connector of Figure 8 is applied.

Figure 1:
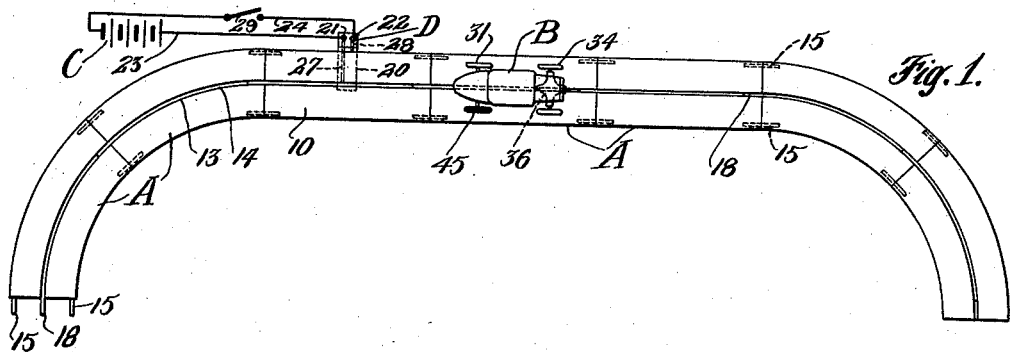
Figure 1 is a more or less diagrammatic plan view illustrating a portion of a roadway and an automobile embodying my invention.

In Figure 1 I have illustrated a portion of a roadway comprising a plurality of road sections A connected together endwise; an electric motor driven automobile B; a source of electric current such as a battery C; and a connector D for making the electric connections between the battery and the roadway.

The track sections A are preferably constructed of sheet metal and each comprises a plane road surface 10, side wall portions 11 provided with flanges 12 for securing the sections to a platform or the like, a longitudinally extending groove 13 preferably located centrally of the section, an electric conductor 14 located in said groove and substantially coextensive therewith, and means such as pins 15 for connecting the sections together. The road surface 10 may be roughened and artificially colored to imitate concrete or dirt roads by a metallic substance that will conduct electricity.

The groove 13 is formed by bending the metal of the section in the form of a U in cross section and the conductor 14 is electrically insulated therefrom as by means of a U shaped insulator 16 coextensive with the groove. In this instance a U-shaped metal member 17 is located between the insulator 16 and the conductor 14. The conductor projects from the end of the groove as illustrated at 18 in Figures 1 and 4 so as to serve as a connecting pin. At its other end the conductor ends short of the end of the groove so that the projecting end of the conductor of the adjacent section may be received by the groove. It will be noted that the metal member 17 serves to make an electrical connection between the conductors of adjacent sections so that it is not necessary for these conductors to come into end to end contact.

The conductor 14, insulator 16 and member 17 may be secured in the groove in any suitable manner for example by providing a bulge as shown at 19 to prevent their displacement. The members may be inserted from the end of the groove or since they are somewhat yieldable the insulator 16 and member 17 may be inserted from the top of the groove and the conductor 14 forced in from the top with a snap action.

In Figures 1, 5 and 6 I have illustrated an electrical connector D attached to one of the sections comprising a base plate 20 of insulating material such as fibre, a pair of terminals 21 and 22 to which wires 23 and 24 leading from the battery C are connected, clip means 25 adapted to have snap engagement with the conductor 14, clip means 26 having snap engagement with the side of the section, a conductor 27 leading from the terminal 21 to the clip means 25, and a conductor 28 leading from the terminal 22 to the clip means 26. As illustrated in Figures 5 and 6 the groove 13, insulator 16 and member 17 are slotted to expose the bottom of a portion of the conductor for snap engagement of the clip 25. The bottom of base plate 20 is made flush with the bottom of the road section by providing a recess 12a in the flange 12 of the section.

It will be seen from the foregoing that one side of the battery C is connected to the conductor 14 by wire 23, conductor 27 and clip 25 and that the other side of the battery is connected to the roadway by wire 24 conductor 28 and clip 26. A controlling switch 29 may be included in the circuit as indicated in Figure 1.

Figure 2:
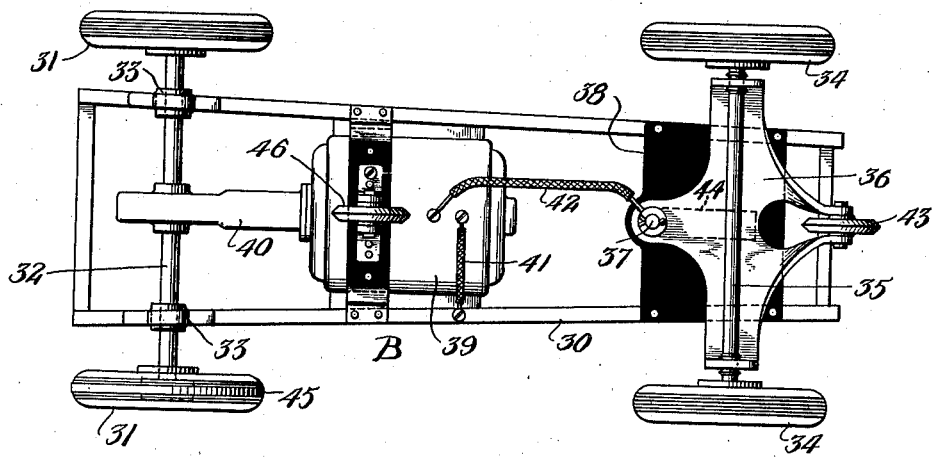
Figure 2 is a bottom view of an automobile constructed in accordance with my invention.
Figure 3:
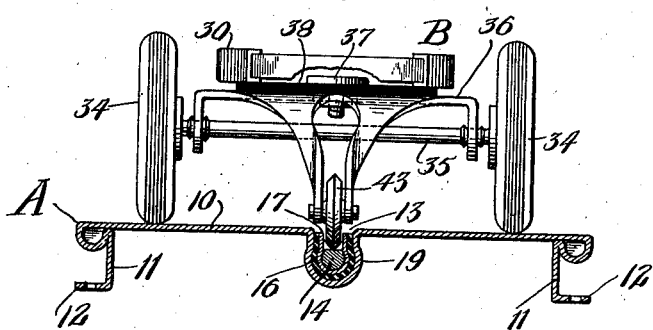
Figure 3 is a front view of the automobile with the body removed and a cross sectional view through the roadway.

Referring now to Figures 2 and 3, the automobile comprises, a chassis 30, a pair of rear wheels 31 having an axle 32 journalled in bearings 33 carried by the chassis, a pair of front wheels 34 having an axle 35 journalled in a truck 36 pivoted at 37, and electrically insulated from the chassis by an insulating plate 38, an electric motor 39 and drive mechanism 40 such as reduction gearing, between the motor and rear wheels.

A wire 41 connects one terminal of the motor to the chassis 30 and a wire 42 connects the other terminal thereof to the insulated truck 36.

The truck 36 carries a roller 43 adapted to run in the groove 13 of the roadway and having electrical contact with the conductor 14 located in the groove. Thus the roller is guided by the groove to effect steering of the automobile and also serves to pick up electric current for the motor. A spring 44 may be employed between the truck 36 and plate 38 to spring press the roller 43 against the conductor 14.

It is pointed out that the wheels of the automobile are provided with rubber tires having usual treads and that they run on the road surface of the roadway in the usual manner of automobiles there being no flanges or the like on the wheels to guide the automobile in travelling over the roadway.

In order to complete the electric circuit I associate a metallic member 45 with one of the rear wheels adapted to have contact with the metal surface of the roadway. As illustrated in Figure 2 the member 45 comprises a disc preferably slightly larger in diameter than the tire, which disc is carried by the axle and it will be seen therefore that the electric current will pass from the road surface to the disc, to the axle, to the chassis and then to the motor. While I have shown the disc directly incorporated in the wheel it is to be understood that it may be separate of the wheel and spaced therefrom. I also contemplate making this electric pick up in the form of a roller or shoe mounted on the chassis of the automobile.

In addition to the combined electric pick up and steering roller 43 I may employ a second roller 46 as shown in Figure 2 adapted to run in the groove 13 to prevent swaying of the automobile at the rear. This roller is insulated from the chassis as shown and may be employed as an electric pick up either alone or in addition to the roller 43.

In Figures 7, 8, and 9 I have illustrated a roadway and electric connector of modified forms. In this instance the electric conductor 14a is in the form of a flat strip fitting the groove and projecting above the road surface 10 and insulated from the groove by a U-shaped insulator 16a. The electric pick up is by means of a forked member 47 carried by the front truck of the automobile and having a pair of guiding or steering rollers 48 engaging the sides of the conductor. In this instance I have shown flat pins 49 for connecting the section together and the projecting end portion 14b of the conductor 14a is adapted to contact with the adjacent end of the conductor of the adjacent section. U-shaped metal members similar to the members 17 above described may be employed to ensure a good electrical connection between adjacent conductors.

As shown at 14c in Figure 9 a portion of the conductor 14a is bared for reception of the connector 50 which is provided with a clip 51 having snap engagement with this bared portion, a clip 52 having snap engagement with the side wall of the road section and terminals for the connection of the electric wires in the manner described above.

Referring to the form of road section illustrated in Figure 4 in which the conductor 14 is set below the road surface this is particularly advantageous because it prevents short circuiting by metal objects being placed on the roadway or by the automobile if it should for some reason sway excessively.

While I have only illustrated straight and curved road sections it is to be understood that these sections may take other forms to provide crossings, tangential road intersections and the like.

No specific claim is made herein to the track section per se, as claims directed thereto have been made part of the subject-matter of a divisional application, Serial No. 161,892, filed September 1, 1937.

I claim:

1. The combination with a toy automobile having a pair of front and a pair of rear wheels, of an electric motor for driving said automobile, a metallic roadway, a longitudinally extending electrical conductor carried by the roadway and insulated therefrom, a source of electric current, conductors leading from said source of electric current to the roadway and to the insulated electrical conductor, one wheel of one of said pairs of wheels having electrical connection with the roadway and the wheels of the other pair of wheels being insulated from the roadway and journalled in a truck, means insulating said pairs of wheels from each other, means establishing electrical connection between said one wheel which has electrical connection with the roadway and the motor, and means establishing electrical connection between said insulated electrical conductor and the motor comprising a contact member carried by the truck and an electric conductor leading from the said truck to the motor.

2. In combination a toy electric motor driven automobile comprises a chassis, a pair of rear wheels journalled on said chassis, a pair of front wheels, a pivoted truck in which said front wheels are journalled, means insulating said truck from said chassis, a roller carried by said truck, an electric motor having driving connection with said rear wheels, an electrical connection between said motor and chassis, an electrical connection between said motor and said roller, a roadway having a metallic road surface and a longitudinally extending electrical conductor insulated from said road surface, said roller having electrical contact with said conductor, means for establishing an electrical connection between said road surface and said rear wheels, a source of electric current, and conductors leading from said source to the road surface and to the insulated electrical conductor.

3. In combination a toy electric motor driven automobile comprising a chassis, a pair of rear wheels journalled on said chassis, a pair of front wheels, a pivoted truck in which said front wheels are journalled, means insulating said truck from said chassis, a roller carried by said truck, an electric motor having driving connection with said rear wheels, an electrical connection between said motor and chassis, an electrical connection between said motor and said roller, a roadway having a metallic road surface and a longitudinally extending electrical conductor insulated from said road surface, said roller having electrical contact with said conductor, means for establishing an electrical connection between said road surface and said rear wheels, a source of electric current, and conductors leading from said source to the road surface and to the insulated electrical conductor, said roller having guided relation with the insulated conductor to effect steering of the automobile.

4. In combination a toy electric motor driven automobile comprising a chassis, a pair of rear wheels journalled on said chassis, a pair of front wheels, a pivoted truck in which said front wheels are journalled, means insulating said truck from said chassis, a roller carried by said truck, an electric motor having driving connection with said rear wheels, an electrical connection between said motor and chassis, an electrical connection between said motor and said roller, a roadway having a metallic road surface and a longitudinally extending groove therein, an electrical conductor in said groove extending lengthwise thereof, insulation between said conductor and said groove, the aforesaid roller being adapted to run in said groove in contact with said conductor whereby it constitutes a combined electric pick up and automobile steering means, means establishing an electrical connection between said road surface and said rear wheels, a source of electric current, and conductors leading from said source to the road surface and to the insulated electrical conductor.

5. In combination a toy electric motor driven automobile comprising a chassis, a pair of rear wheels journalled on said chassis, a pair of front wheels, a pivoted truck in which said front wheels are journalled, means insulating said truck from said chassis, a roller carried by said truck, an electric motor having driving connection with said rear wheels, an electrical connection between said motor and chassis, an electrical connection between said motor and said roller, a roadway having a metallic road surface and a longitudinally extending electrical conductor insulated from said road surface, said roller having electrical contact with said conductor, means for establishing an electrical connection between said road surface and said rear wheels, a source of electric current, and conductors leading from said source to the road surface and to the insulated electrical conductor, together with a second roller mounted from the chassis toward the rear portion thereof and adapted to operate in guiding contacting relation to said longitudinally extending insulated electrical conductor of said roadway, and means insulating said second roller from the chassis, said second roller serving to prevent rear swaying of the automobile.

ALBERT EDWARD CULLEN.